United States Patent [19]
Johnson et al.

[11] Patent Number: 5,471,616
[45] Date of Patent: Nov. 28, 1995

[54] METHOD OF AND APPARATUS FOR PROVIDING EXISTENTIAL PRESENCE ACKNOWLEDGEMENT

[75] Inventors: William J. Johnson, Flower Mound; Robert S. Keller, Grapevine; George C. Manthuruthil, Coppell; Marvin L. Williams, Lewisville, all of Tex.

[73] Assignee: International Business Machines Corporation, Armonk, N.Y.

[21] Appl. No.: 877,908

[22] Filed: May 1, 1992

[51] Int. Cl.⁶ ............................................. G06F 7/04
[52] U.S. Cl. ............................... 395/700; 340/825.34
[58] Field of Search .............................. 395/700, 650, 395/275, 200, 155, 100; 340/825.31, 825.3, 825.34

[56] References Cited

U.S. PATENT DOCUMENTS

| | | | |
|---|---|---|---|
| 4,420,751 | 12/1983 | Paganini et al. | 340/825.33 |
| 4,805,222 | 2/1989 | Young et al. | 382/2 |
| 4,901,223 | 2/1990 | Rhyne | 364/200 |
| 5,197,124 | 3/1973 | Busboom et al. | 395/155 |
| 5,201,033 | 4/1993 | Eagen et al. | 395/155 |
| 5,272,754 | 12/1993 | Boerbert | 380/25 |

OTHER PUBLICATIONS

International Business Machines Corporation "CP Command and Utility Reference, Release 1" IBM No. SC 24–5519–00, published Mar. 1991 at Endicott N.Y.
M. G. Sobelle "A Practical Guide to UNIX System V, Second Edition" published 1991 at Redwood City, Calif.
K. Christian, and S. Richter "The XENIX Command Reference Guide" published 1989 at New York, N.Y.
P. E. Bourne "UNIX for VMS Users" published 1990 in the United States of America.

*Primary Examiner*—Kevin A. Kriess
*Attorney, Agent, or Firm*—Geoffrey A. Mantooth

[57] ABSTRACT

Method of, and apparatus for, providing automatic detection of the physical presence of a user of a data processing system. The present invention comprises an Event Detection Process, a Presence Detection Process, and an Interrogator Process. The Event Detection Process detects presence indicating events. The Presence Detection Process evaluates the presence indicating events to determine the physical presence of a user or someone else other than a user. The Interrogator Process provides an interface to a requesting user and formulates appropriate queries to be sent to one or more Presence Detection Processes.

8 Claims, 5 Drawing Sheets

METHOD OF AND APPARATUS FOR PROVIDING EXISTENTIAL PRESENCE ACKNOWLEDGEMENT

CROSS REFERENCE TO RELATED APPLICATIONS

This application is related in subject matter to the following U.S. Patent filed concurrently herewith and assigned to a common assignee:

U.S. Pat. No. 5,349,662 filed by W. J. Johnson, et. al., entitled "Method of and Apparatus for Providing a Group Query".

The foregoing application is incorporated herein by reference.

TECHNICAL FIELD OF THE INVENTION

This invention relates in general to data processing systems, and in particular to a method of, and apparatus for, providing automatic detection of the physical presence of a user of a data processing system.

BACKGROUND OF THE INVENTION

Conventional data processing systems may provide commands for inquiring about the status of a user of the data processing system. The types of status information typically provided may include which users are logged on to a system, when a user logged on, which workstation the user is logged onto, which programs are being executed by a user, and how long such programs have been executing. However, when a first user desires to inquire about the physical presence of a second user, no capability is provided by conventional systems. If one desires to ask if someone is at his workstation, or in his office, or in his department, or in his building, or in any other physical area, then conventional systems cannot answer. This is a problem when the first user desires to initiate an action on the system which either requires, depends upon, or would be furthered by the physical presence of the second user.

The state of the prior art is demonstrated by the IBM (International Business Machines Corporation) VM* Operating System QUERY USERS, QUERY NAMES, and QUERY USERID commands, the DEC (Digital Equipment Corporation) VMS* Operating System SHOW USER command, and the USL (Unix System Laboratories) UNIX* System V Operating System USERS, WHO, WHODO, RWHO, and FINGER commands. (IBM and VM are registered trademarks of International Business Machines Corporation; DEC and VMS are registered trademarks of Digital Equipment Corporation; USL and UNIX are trademarks of Unix System Laboratories in the United States of America and other countries.)

The IBM VM* Operating System QUERY USERS command gives the number of users logged on to the system. The QUERY NAMES command lists the userids of all logged on users. The QUERY USERID command tells if a specific user is logged on to the system. Although these commands tell whether a user is logged on to a system, they do do not provide any information on the physical presence of a user. This is due to the fact that a user may be logged onto a system, but still not be physically present at the logged on terminal device. In addition, these commands do not provide any information about users relative to remote systems in a network. These commands also do not provide any information about the user relative to a terminal device if such terminal device is an intelligent terminal executing its own operating system and applications in addition to being logged on to the system. In addition, these commands only provide a query for a single user or for all users on a system. These commands do not provide a query for a group of users sharing a common characteristic.

The DEC VMS* Operating System SHOW USER command provides a list of the users currently logged on to the system and their terminal device numbers. Again, this command does not provide any information on the physical presence of a user; nor does it provide any information about users relative to remote systems in a network; nor does it provide a query for a group of users sharing a common characteristic.

The USL UNIX* System V Operating System USERS command provides a list of the users currently logged on to the system. The WHO command provides the names of the users currently logged on to the system, their terminal device numbers, the times they logged on, and the duration of time that their terminal devices have been inactive. The WHODO command provides for each logged on user or for a single named user their terminal device numbers and how long they have been logged on. In addition, WHODO provides for each program process that a user is executing at the time of the inquiry, the name of the program process, the terminal device on which the program process is executing, its process ID number, and the amount of CPU (central processing unit) seconds consumed so far by the process. The RWHO command and the FINGER command provide the same information as the WHO command on remote users on other systems in a network, and in addition identify the remote system on which a user is logged on. Again, although these commands tell whether a user is logged on to a system, they do do not provide any information on the physical presence of a user. Also, although these commands do provide information about users relative to remote systems in a network, this information is limited to remote systems which are also executing a UNIX operating system. In addition, these commands do not provide a query for a group of users sharing a common characteristic.

For a situation which may call for a user needing to know about the physical presence of another user, consider the following situations. A first user may wish to verify that a second user is in his office. If the second user is not answering his phone or system messages for whatever reasons, the first user may be unable to verify the second user's physical presence unless he or someone else actually goes to the second user's office. Another situation may be when the first user wishes to fax a confidential or sensitive document to the second user, but is unwilling to do so if the receiving fax device is unattended. Still another situation may be when a first user wishes to call on short notice a meeting of a group of users. To determine if all of the potential attendees are physically present, the first user has to check on each potential attendee by either calling them on the phone, sending them a system message, or going to their offices. Still another situation may be when a user wishes to communicate with any member of a group that is physically present, without having to check on a number of members of the group before finding a member that is physically present. For example, the user may have a system problem and wishes to speak with anyone in the system support organization. Still another situation may be when a user wishes to verify that a physical area is clear and that no one is physically present in the physical area. Since a user in the physical area may not respond to the phone or system messages, the requesting user may have to physically check the entire physical area.

The prior art approaches described above fail to meet the needs of the above situations and present the user with three difficulties. The first difficulty is that the prior art approaches detect if a user is logged on to a system. They do not detect the physical presence of a user. The second difficulty is that if a user attempts to rely on the prior art to detect the physical presence of another user, the user may receive presence false alarms. A presence false alarm is an indication that a user is physically present when the user is not actually physically present. A presence false alarm may result when a user first logs on to a system and then leaves the area leaving the logon active. A presence false alarm may also result when a user logs on to a system from a remote location other than his normal workstation in his office. The third difficulty is that if a user attempts to rely on the prior art to detect the physical presence of another user, the user may receive presence errors. A presence error is an indication that a user is not physically present when the user is actually physically present. A presence error may result when the user is physically present in his office, but not logged on to a system.

Thus the prior art provides no method of, or apparatus for, automatic detection of a user's physical presence. As such, there is a need for a method of, and apparatus for, providing automatic detection of the physical presence of a user of a data processing system.

SUMMARY OF THE INVENTION

The invention disclosed herein comprises a method of, and apparatus for, providing automatic detection of the physical presence of a user of a data processing system. The method and apparatus described herein substantially eliminate or reduce the difficulties of attempting to determine the physical presence of a user of a data processing system by providing automatic detection of the physical presence of a user of a data processing system.

In accordance with one aspect of the present invention, automatic detection of the physical presence of a user of a data processing system is provided.

Another aspect of this invention is automatic detection of the physical presence of a user of a remote data processing system different from the requesting user's data processing system.

Yet another aspect of this invention is automatic detection of the physical presence of a user of a remote data processing system executing a different operating system from that of the requesting user's data processing system.

Yet another aspect of this invention is automatic detection of the physical presence of a user provided by the use of a Presence Event Table. The Presence Event Table comprises a list of events which may occur in a system and which indicate the physical presence of a user within a physical area in proximity to the system. The events may be described or represented by parameters, including, but not limited to, interrupt levels, interrupt priorities, semaphore content, or interprocess communication content. The parameters are sufficient to discriminate presence indicating events from events which do not indicate the physical presence of a user.

Yet another aspect of this invention is automatic detection of the physical presence of a user provided by monitoring interprocess communications from device drivers in a data processing system and by recognizing presence indicating events.

Yet another aspect of this invention is automatic detection of the physical presence of a user provided by logging presence indicating events in a Presence Detection Database whose entries include a description of the presence indicating events and a time of occurrence of the presence indicating events.

Yet another aspect of this invention is automatic detection of the physical presence of a user provided by a Proximity Table for each user that contains proximity intervals and corresponding physical areas for that user. The proximity interval is the interval of time required for the user to leave the corresponding physical area.

Yet another aspect of this invention is automatic detection of the physical presence of a user provided by determining if a proximity interval is greater than the time interval since the last event logged for a user in the Presence Detection Database. If the proximity interval is greater than the time interval since the last logged event, then an event has occurred indicating the physical presence of someone in the physical area corresponding to that proximity interval.

Yet another aspect of this invention is automatic detection of the physical presence of a user provided by determining if a verified event is logged for a user. A verified event is an event which requires the user's physical presence and is verified by that user.

Yet another aspect of this invention is automatic detection of the physical presence of a user provided by determining if a user was physically present since a verified event by determining that there are no time intervals between logged events since the occurrence of the verified event greater than a proximity interval.

Yet another aspect of this invention is automatic detection of the physical presence of someone, but not necessarily the user, in the physical area corresponding to the proximity interval provided by determining that there is a time interval between logged events since the occurrence of the verified event greater than a proximity interval.

Yet another aspect of this invention is automatic detection of the physical presence of someone, but not necessarily the user, in a physical area corresponding to a proximity interval provided by determining that there is no verified event logged for that user.

Yet another aspect of this invention is that queries may be of the form of a single user query, a multiple user query, a group query, or a physical area query.

Yet another aspect of this invention is that the appropriate parameters for formulating each user query that comprise either a single user query, a multiple user query, a group query, or a physical area query are extracted from a user directory.

Yet another aspect of this invention is providing the establishment of an appropriate network connection to and communications with an appropriate Presence Detection Process whether such Presence Detection Process resides on the same data processing system or resides on another system in a network.

Yet another aspect of this invention is automatic detection of the physical presence of someone, but not necessarily the user, provided by determining if a presence indicating event occurs during a proximity interval by direct monitoring of a device driver.

Yet another aspect of this invention is automatic detection of the physical presence of a user provided by determining if a verified event occurs during a proximity interval by direct monitoring of a device driver.

Yet another aspect of this invention is automatic detection of the physical presence of someone, but not necessarily the user, provided by determining if a verified event does not occur during a proximity interval by direct monitoring of a device driver.

Yet another aspect of this invention is automatic detection of the physical absence of a user provided by determining that no presence indicating event occurs during a proximity interval by direct monitoring of a device driver.

The present invention has the advantage of allowing a first user of a data processing system to detect the physical presence of a second user of the data processing system or a second user of another data processing processing connected to the same network as the data processing system.

The present invention has the further advantage of allowing a first user to initiate an action that requires, depends upon, or would be furthered by a second user's physical presence.

The present invention has the still further advantage of allowing a first user to detect the physical presence of a second user within a particular physical area in proximity of the second user's data processing system.

The present invention has the still further advantage of allowing a first user to detect the physical presence of any or all user members of a group sharing a common characteristic.

The present invention has the still further advantage of allowing a first user to detect the physical presence of any users within a specified physical area in proximity of a data processing system.

The present invention has the still further advantage of substantially eliminating or reducing presence false alarms.

The present invention has the still further advantage of of substantially eliminating or reducing presence errors.

The present invention has the still further advantage of allowing queries of the form of a single user query, a multiple user query, a group query, or a physical area query.

The present invention has the still further advantage of allowing a first user to detect the physical presence of one or more users within a specified physical area in proximity of a data processing system, without the one or more users being aware of the detection of their physical presence.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Figure 1:
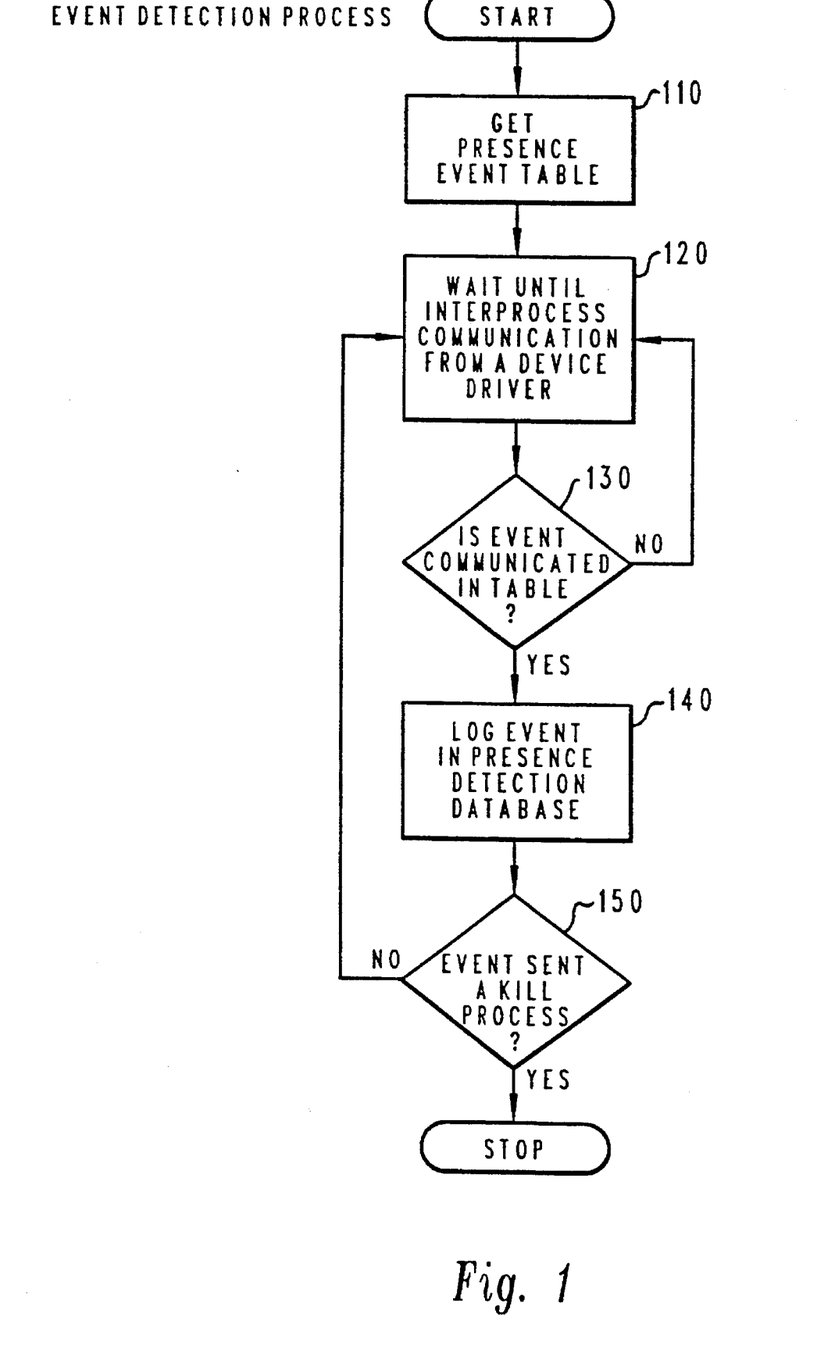
FIG. 1 is a flow chart illustrating the operations preferred in carrying out the event detection process portion of the present invention.
Figure 2:
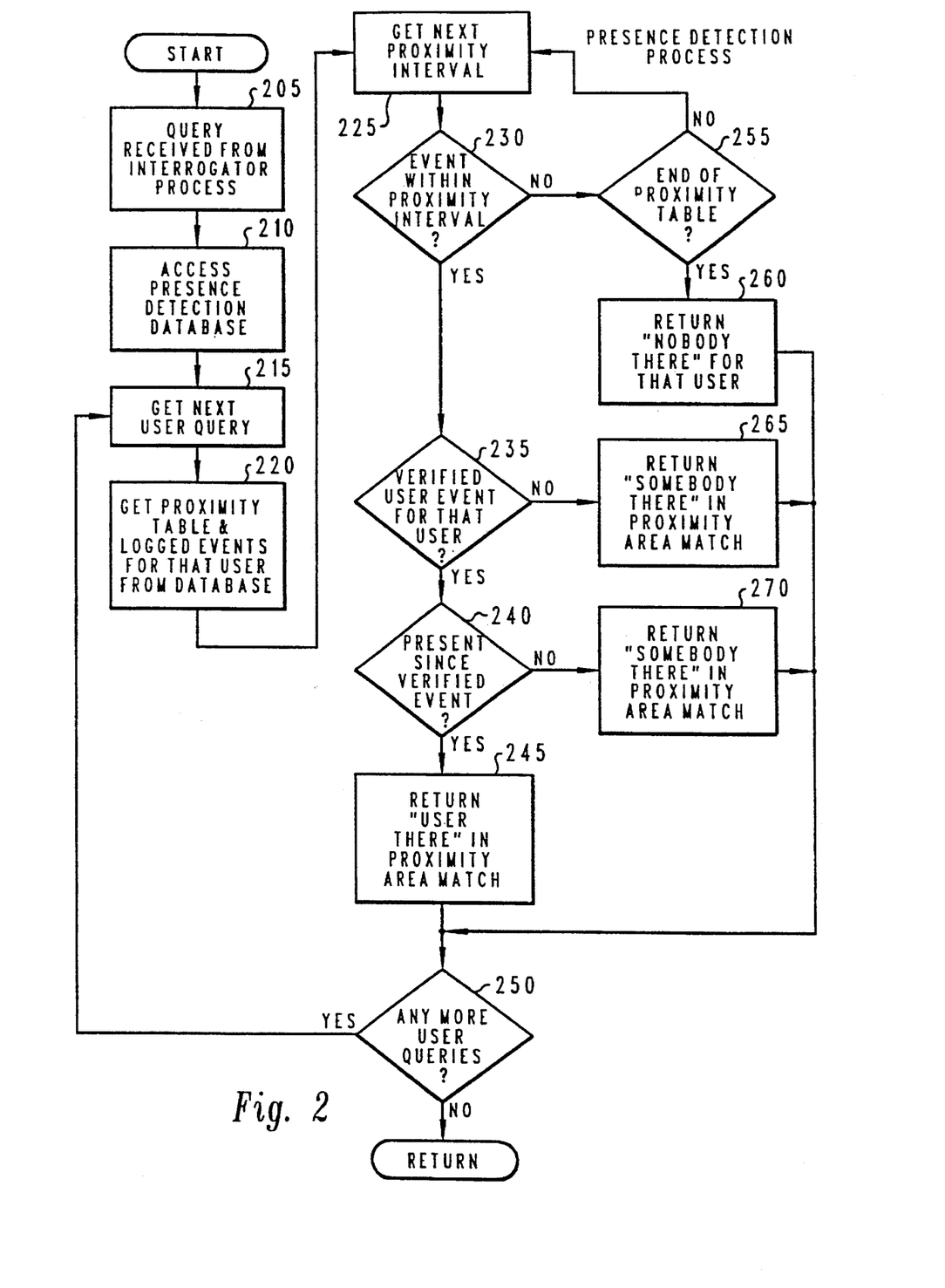
FIG. 2 is a flow chart illustrating the operations preferred in carrying out the presence detection process portion of the present invention.
Figure 3:
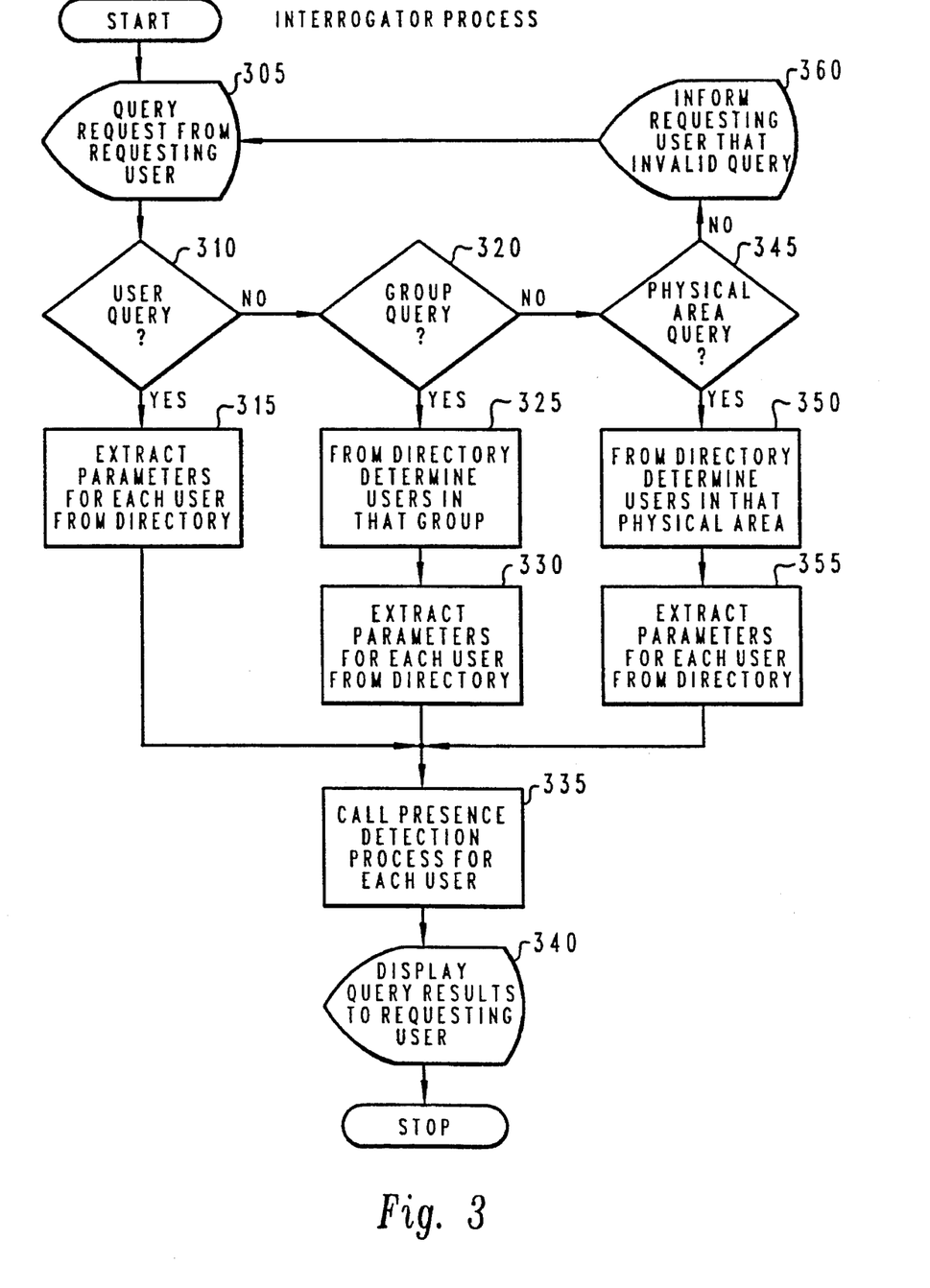
FIG. 3 is a flow chart illustrating the operations preferred in carrying out the interrogator process portion of the present invention.

Referring first to FIG. 1 through FIG. 3, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

The operations preferred in carrying out the present invention are implemented as three processes or programs comprising an Event Detection Process, a Presence Detection Process, and an Interrogator Process. The Event Detection Process, illustrated in FIG. 1, detects presence indicating events. The Presence Detection Process, illustrated in FIG. 2, evaluates the presence indicating events to determine the physical presence of a user or someone else other than a user. The Interrogator Process, illustrated in FIG. 3, provides an interface to a requesting user and formulates appropriate queries to be sent to one or more Presence Detection Processes.

As shown in FIG. 1, which illustrates the operations preferred in carrying out the Event Detection Process portion of the present invention, after the start of the program, process block 110 accesses a Presence Event Table. The Presence Event Table comprises a list of events which may occur in a system and which may indicate the physical presence of a user, or someone else other than a user, within a physical area in proximity to the system. These events may occur in a data processing system, in devices attached to a data processing system, in device drivers servicing such devices, or in programs other than such device drivers. These devices may include input/output devices such as keyboards, mouse, light pens, touch screens, track balls, displays, telephones, printers, scanners, multimedia input/ output devices, and other devices which may require the physical presence of a user, or someone else other than a user, for their operation. These devices may also include sensors such as infrared detectors, visible light detectors, radio frequency detectors, electrostatic detectors, magnetic detectors, other electromagnetic detectors, and other sensors which may detect the physical presence of a user or someone else other than a user. The events may be described or represented by parameters, including, but not limited to, interrupt levels, interrupt priorities, semaphore content, or interprocess communication content. The parameters are sufficient to discriminate the presence indicating events from events which do not indicate the physical presence of a user or someone else other than a user. For example, the Presence Event Table may include a description of an event such as a printer status changing from not ready to ready. This event occurs when someone pushes the ready button on the printer, and therefore, this event indicates the physical presence of someone near the printer. However, the Presence Event Table does not include an event comprising the printer status changing from ready to not ready, as this event may be caused by something other than a user's physical presence. For example, the printer status may change to not ready due to the printer running out of paper, ink, or ribbon.

Thereafter, process block 120 monitors interprocess communications and waits until an interprocess communication is sent by a device driver or a non-device driver program in the system. If such an interprocess communication is recognized by process block 120, then decision block 130 is used to determine whether the interprocess communication is an event described in the Presence Event Table. If the interprocess communication is an event described in the Presence Event Table, then process block 140 logs the event in a Presence Detection Database. The log entry will include a description of the event and a time of occurrence of the event. Logged entries over a configurable time interval may be stored for history information, if desired. The preferred embodiment only stores entries since, and including, the last verified event for a user, thereby reducing the use of storage for information which may be unnecessary.

Thereafter, decision block 150 determines whether the event is a kill process. If the event is a kill process, then the program stops. If the event is not a kill process, then the program loops back to processing block 120 to await the next interprocess communication.

Returning now to decision block 130, if the interprocess communication is not an event described in the Presence Event Table, then the program loops back to processing block 120 to await the next interprocess communication.

Referring next to FIG. 2, which illustrates the operations preferred in carrying out the Presence Detection Process portion of the present invention, after the start of the program, process block 205 awaits the receipt of a query from the Interrogator Process portion of the present invention. Such a query may comprise one or more user queries. After receipt of such a query process block 210 accesses the Presence Detection Database (described above).

Thereafter, process block 215 gets the next user query from the query received by process block 205.

Thereafter, process block 220 gets a Proximity Table for the user specified in the User query and a sequence of logged events for the user specified in the user query from the Presence Detection Database. The logged events are events logged in the Presence Detection Database for that user by process block 140 of FIG. 1 as described above. The Proximity Table for that user contains proximity intervals and corresponding physical areas for that user. The proximity interval is the interval of time required for the user to leave the corresponding physical area. For example, the Proximity Table for a user may consist of the following entries:

| Entry Number | Proximity Interval | Corresponding Physical Area |
| --- | --- | --- |
| 1 | 1.0 | workstation |
| 2 | 3.0 | desk |
| 3 | 10.0 | office |
| 4 | 30.0 | department |
| 5 | 45.0 | floor |
| 6 | 60.0 | building |
| 7 | 300.0 | site |

The first Proximity Table entry, entry number 1, means that one second is required for the user to leave the immediate physical area of his workstation. This entry also means that if a presence indicating event has occurred in the preceding one second time interval, then the user may be at his workstation. Alternatively, this entry means that if a presence indicating event has not occurred in the preceding one second time interval, then the user may not be at his workstation. Likewise, the third Proximity Table entry, entry number 3, means that ten seconds are required for the user to leave his office. This entry also means that if a presence indicating event has occurred in the preceding ten second time interval, then the user may be in his office. Alternatively, this entry means that if a presence indicating event has not occurred in the preceding ten second time interval, then the user may not be in his office. The remaining entries in the Proximity Table have similar meanings.

Thereafter, process block 225 gets from the Proximity Table the next entry comprising a proximity interval and its corresponding physical area. For example, in its first execution, process block 225 gets entry number one whose proximity interval is one second in the sample Proximity Table described above.

Thereafter, decision block 230 determines if the proximity interval is greater than the time interval since the last event logged for that user in the Presence Detection Database. If the proximity interval is greater than the time interval since the last logged event, then an event has occurred indicating the physical presence of someone in the physical area corresponding to that proximity interval. For example, assume the first proximity interval is one second for the user's workstation. Also assume that the time interval since the last logged event occurred is one half second. In this example, the proximity interval for the workstation is greater than the time interval since the last logged, event, and therefore, someone is still at the user's workstation. However, note that detecting someone at the user's workstation is not necessarily detecting the user at his workstation.

If the proximity interval is greater than the time interval since the last logged event, then decision block 235 determines if a verified event is logged for that user. A verified event is an event which requires a user's physical presence and is verified by that user. An example of a verified event is the user successfully unlocking, by the entry of a secret password known only to the user, the workstation hardware, workstation operating system, workstation application software, workstation network access, access to other connected workstations or hosts, or the operating systems or application software of such connected workstations or hosts.

If a verified event is logged for that user, then decision block 240 determines if the user was physically present since the verified event. Alternatively, decision block 240 determines if there are no time intervals between logged events since the occurrence of the verified event greater than the proximity interval.

If there are no time intervals between logged events since the occurrence of the verified event greater than the proximity interval, then all of the user's time since the verified event is accounted for in the physical area corresponding to that proximity interval, and process block 245 sets the return status for that user to indicate that the user is in the corresponding physical area. For example, process block 245 may set the return status for user John Doe to "John Doe is in his office".

Thereafter, decision block 250 determines if there are any more user queries to be processed from the query received from the Interrogator Process. If there are not any more user queries, then the program returns to the Interrogator Process which called the program. Alternatively, the program may stop if it were a separate program process invoked by the Interrogator Process. Alternatively, the program could become dormant awaiting the next query if it is an active process in a multi-process system.

Returning now to decision block 250, if there are any more user queries, then the program loops back to processing block 215 to process the additional user queries as described above.

Returning now to decision block 240, if there is a time interval between logged events since the occurrence of the verified event greater than the proximity interval, then the user's time since the verified event cannot be fully accounted for, and process block 270 sets the return status for that user to indicate that someone, but not necessarily the user, is in the physical area corresponding to the proximity interval. For example, the status may be set to "Someone is in John Doe's office, but may not be John Doe". Thereafter, the program proceeds to decision block 250.

Returning now to decision block 235, if no verified event is logged for that user, then processing block 265 sets the return status for that user to indicate that someone, but not necessarily the user, is in the physical area corresponding to the proximity interval. For example, the status may be set to "Someone is in John Doe's office, but may not be John Doe". Thereafter, the program proceeds to decision block 250.

Returning now to decision block 230, if the proximity interval is not greater than the time interval since the last logged event, then decision block 255 determines if the end of the Proximity Table has been reached and if no proximity intervals remain to be processed. If the end of the Proximity Table has not been reached and there are proximity intervals remaining to be processed, then the program loops back to process block 225 to get and process the next proximity interval.

Returning now to decision block 255, if the end of the Proximity Table has been reached and there are no proximity intervals remaining to be processed, then processing block 260 sets the return status for that user to indicate that no one is there. For example, the status may be set to "Nobody there". Thereafter, the program proceeds to decision block 250.

Referring next to FIG. 3, which illustrates the operations preferred in carrying out the Interrogator Process portion of the present invention, after the start of the program, process block 305 awaits the receipt of a query from a requesting user. The requesting user is that user wishing to detect the physical presence of a user. The query may be of the form of a single user query, a multiple user query, a group query, or a physical area query. For example, the query may ask if John Doe is present, or if anyone in John Doe's department is present, or if anyone in John Doe's building is present.

Thereafter, decision block 310 determines if the query is a user query.

If the query is a user query, then processing block 315 extracts appropriate parameters for each user in the query from a user directory. These parameters may include the systems on which the user is authorized, the user's system ID(s), the location of such systems, the network paths to such systems, the terminals or workstations the user uses to access such systems, and the Presence Detection Processes for such systems.

Thereafter, processing block 335 calls appropriate Presence Detection Processes, passing appropriate parameters, for each user specified in the query. If the Presence Detection Process resides on another system in a network, then processing block 335 also establishes appropriate network connection and handles the communication of the query to the other system and the receipt of the return status from the other system.

Thereafter, processing block 340 provides to the requesting user the return status and other results of the query as returned from the Presence Detection Process. Embodiments of the return status and other results include status strings or status codes which may be mapped to local user friendly interfaces. Thereafter, the program stops. Alternatively, the program may return to another process which called the program. Alternatively, the program may become dormant awaiting the next query if it is an active process in a multi-process system.

Returning now to decision block 310, if the query is not a user query, then decision block 320 determines if the query is a group query. A group is a collection of users who share a common characteristic. This common characteristic may be the same department, the same surname, the same job title, using the same device, executing the same process or application, etc.

If the query is a group query, then processing block 325 accesses the user directory and determines which users are contained in the group. Thereafter, processing block 330 extracts appropriate parameters for each user contained in the group from the user directory. These parameters may include the systems on which the users are authorized, the users' system ID(s), the location of such systems, the network paths to such systems, the terminals or workstations the users use to access such systems, and the Presence Detection Processes for such systems. Thereafter, the program proceeds to processing block 335 which calls the Presence Detection Process as described above.

Returning now to decision block 320, if the query is not a group query, then decision block 345 determines if the query is a physical area query. A physical area query requests presence detection on all users who reside in that physical area. This physical area may be the same office, department area, floor, building, complex, site, etc.

If the query is a physical area query, then processing block 350 accesses the user directory and determines which users are contained in the physical area. Thereafter, processing block 355 extracts appropriate parameters for each user contained in the physical area from the user directory. These parameters may include the systems on which the users are authorized, the users' system ID(s), the location of such systems, the network paths to such systems, the terminals or workstations the users use to access such systems, and the Presence Detection Processes for such systems. Thereafter, the program proceeds to processing block 335 which calls the Presence Detection Process as described above.

Returning now to decision block 345, if the query is not a physical area query, then processing block 360 informs the requesting user that an invalid query has been requested. Thereafter, the program proceeds to processing block 305 to await another query from the requesting user.

Although the Interrogator Process is illustrated in the context of queries for automatic detection of the physical presence of a user of a data processing system, this should not be construed in a limiting sense. The Interrogator Process may also generate other types of queries, other than presence detection queries, seeking other types of user-specific information or system-specific information. For example, the Interrogator Process may generate a group query based on a common characteristic of using a particular device, and request information on users using that device, information on the device, or other system information related to the group or the device. The Interrogator Process also may generate a group query based on a common characteristic of using a particular application program, and request information on users using that application program, information on the application program, or other system information related to the group or the application program.

Figure 4:
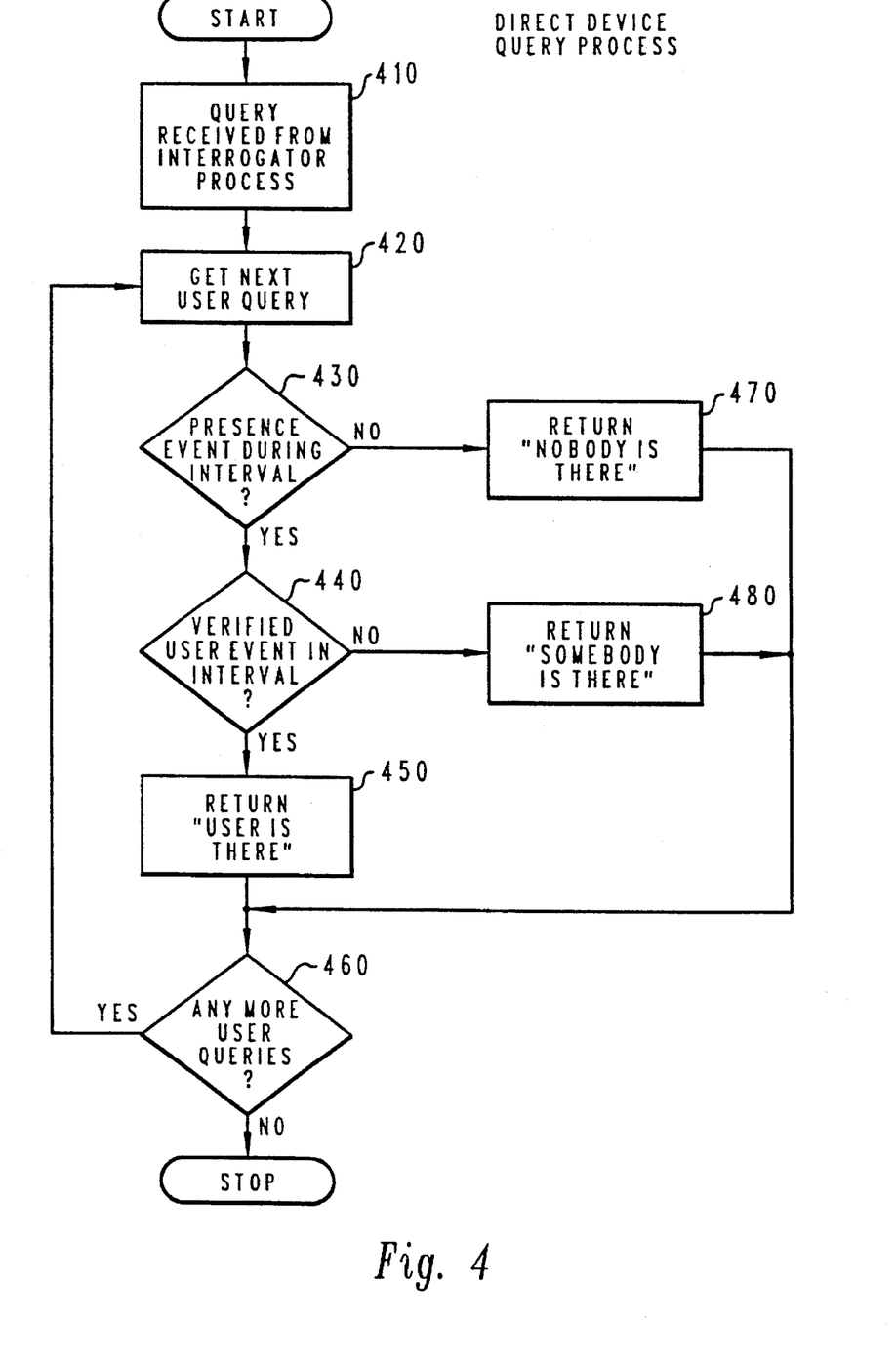
FIG. 4 is a flow chart illustrating the operations used in carrying out an alternative embodiment of the present invention.

Referring now to FIG. 4, a flowchart illustrating operations for an alternative embodiment for carrying out the present invention is shown. This alternative embodiment does not contain either the Event Detection Process or the Presence Detection Process. In lieu of the Event Detection Process and the Presence Detection Process, a single Direct Device Query Process is provided. Thus this alternative embodiment comprises a Direct Query Process and an Interrogator Process.

After the start of the program, process block 410 awaits the receipt of a query from the Interrogator Process portion of the present invention. Such a query may comprise one or more user queries.

Thereafter, process block 420 gets the next user query from the query received by process block 410.

Thereafter, decision block 430 determines if a presence indicating event occurs during a proximity interval. This proximity interval may either be a default value or a value specified by the requesting user.

If a presence indicating event occurs during the proximity interval, then decision block 430 determines if a verified event occurred during the proximity interval.

If a verified event occurs during the proximity interval, then process block 450 sets the return status for that user to indicate that the user is there.

Thereafter, decision block 460 determines if there are any more user queries to be processed from the query received from the Interrogator Process. If there are not any more user queries, then the program returns to the Interrogator Process which called the program. Alternatively, the program may stop if it were a separate program process invoked by the Interrogator Process. Alternatively, the program may become dormant awaiting the next query if it is an active process in a multi-process system.

Returning now to decision block 460, if there are any more user queries, then the program loops back to processing block 420 to process the additional user queries as described above.

Returning now to decision block 440, if a verified event does not occur during the proximity interval, then process block 480 sets the return status for that user to indicate that someone, but not necessarily the user, is there. Thereafter, the program proceeds to decision block 460 to process any additional user queries.

Returning now to decision block 430, if no presence indicating event occurs during the proximity interval, then processing block 470 sets the return status for that user to indicate that no one is there. Thereafter, the program proceeds to decision block 460 to process any additional user queries.

Figure 5:
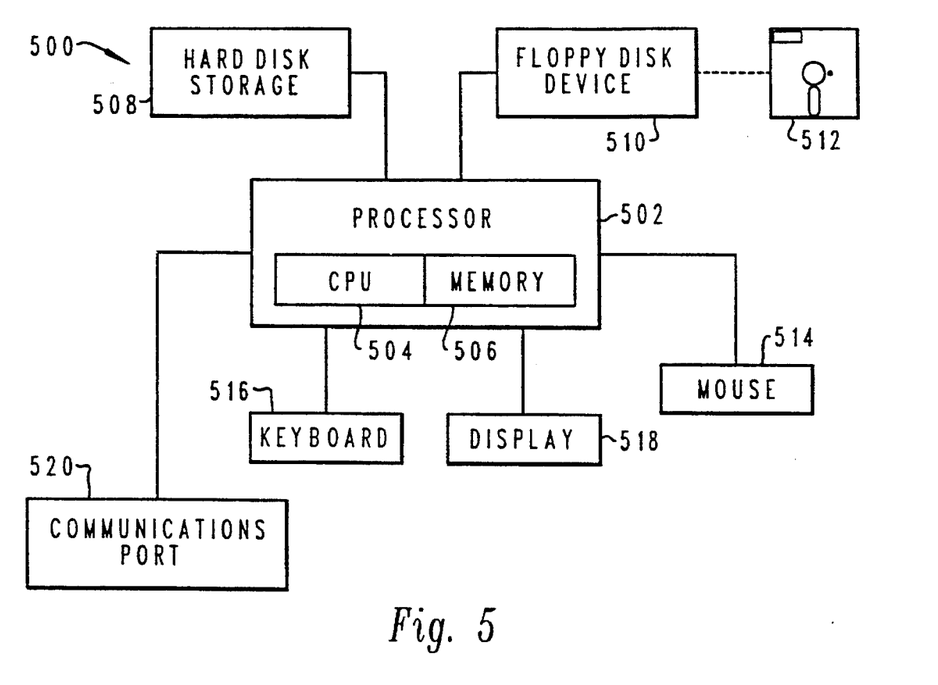
FIG. 5 is a block diagram of a computer system used in performing the method of the present invention and forming part of the apparatus of the present invention.

Referring now to FIG. 5, there is shown in block diagram form, a data processing system 500 according to the present invention. The data processing system 500 includes a processor 502, which includes a central processing unit (CPU) 504, and a memory 506. Additional memory, in the form of a hard disk file storage 508 and a floppy disk device 510, is connected to the processor 502. Floppy disk device 510 receives a diskette 512 which has computer program code recorded thereon that implements the present invention in the data processing system 500. The data processing system 500 may include user interface hardware, including a mouse 514 and a keyboard 516 for allowing user input to the processor 502 and a display 518 for presenting visual data to the user. The data processing system may also include a communications port 520 for communicating with a network or other data processing systems.

Although the present invention has been particularly shown and described with reference to a preferred embodiment, it will be understood by those skilled in the art that various changes in form and detail may be made without departing from the spirit and the scope of the invention.

What is claimed is:

1. A method of providing automatic detection of a physical presence of a user of a data processing system, said method being performed by the data processing system, comprising the steps of:

detecting a presence indicating event in the data processing system, wherein the presence indicating event is an event which occurs in the data processing system and which indicates the physical presence of a user within a physical area in proximity to the data processing system, wherein the presence indicating event is a verified event, wherein a verified event is a presence indicating event which requires a user's presence and is verified by a user;

evaluating the presence indicating event to determine the physical presence of a user; and the step of evaluating the presence indicating event to determine the physical presence of a user comprises the step of determining if the presence indicating event occurs during a proximity interval, wherein the proximity interval is an interval of time required for a user to leave the physical area;

wherein the step of evaluating the presence indicating event to determine the physical presence of a user, further comprises the step of logging the presence indicating event in a database;

the step of evaluating the presence indicating event to determine the physical presence of a user, further comprises the steps of:

i. determining a user is physically present in a physical area corresponding to a proximity interval if there is not a time interval, between logged presence indicating events since an occurrence of a verified event, greater than a proximity interval;

ii. determining someone is physically present in a physical area corresponding to a proximity interval if there is a time interval, between logged presence indicating events since an occurrence of a verified event, greater than a proximity interval;

iii. determining someone is physically present in a physical area corresponding to a proximity interval if a proximity interval is greater than a time interval since a last presence indicating event, but there is not a verified event logged for a user; and iv. determining no one is physically present in a physical area corresponding to a proximity interval if a proximity interval is not greater than a time interval since a last presence indicating event.

2. An apparatus for providing automatic detection of a physical presence of a user of a data processing system comprising:

means for detecting a presence indicating event in the data processing system, wherein the presence indicating event is an event which occurs in the data processing system and which indicates the physical presence of a user within a physical area in proximity to the data processing system, wherein the presence indicating event is a verified event, wherein a verified event is a presence indicating event which requires a user's presence and is verified by a user;

means for evaluating the presence indicating event to determine the physical presence of the user; and the means for evaluating the presence indicating event to determine the physical presence of the user comprises means for determining if a presence indicating event occurs during proximity interval;

the means for evaluating the presence indicating event to determine the physical presence of a user, further comprises means for logging the presence indicating event in a database;

the means for evaluating the presence indicating event to determine the physical presence of a user, further comprises:

i. means for determining a user is physically present in a physical area corresponding to a proximity interval if there is not a time interval, between logged presence indicating events since an occurrence of a verified event, greater than a proximity interval;

ii. means for determining someone is physically present in a physical area corresponding to a proximity interval if there is a time interval, between logged presence indicating events since an occurrence of a verified event, greater than a proximity interval;

iii. means for determining someone is physically present in a physical area corresponding to a proximity interval if a proximity interval is greater than a time interval since a last presence indicating event, but there is not a verified event logged for a user; and iv. means for determining no one is physically present in a physical area corresponding to a proximity interval if a proximity interval is not greater than a time interval since a last presence indicating event.

3. A method of providing automatic detection of a physical presence of a user of a data processing system, said method being performed by the data processing system, comprising the steps of:

selecting a proximity interval of time, said proximity interval of time being an amount of time for a user to leave the data processing system and exit a selected area that is in proximity to the data processing system;

detecting at least two presence indicating events in the data processing system, wherein a presence indicating event is an input event which occurs in the data processing system and which indicates the physical presence of a user within a physical area that is in proximity to the data processing system;

evaluating the presence indicating events to determine the physical presence of a user by determining if the two presence indicating events occur within an interval of time that is less than or equal to the proximity interval of time and if so, then providing an indication that a user is within the selected area, and if not, then providing an indication that a user is not within the selected area.

4. The method of claim 3 wherein at least one of the presence indicating events is a verified event, wherein a verified event is a presence indicating event which requires a user's presence and is verified by a user.

5. The method of claim 4, wherein the step of evaluating the presence indicating events to determine the physical presence of a user, further comprises the step of:

logging the presence indicating event in a database.

6. An apparatus for providing automatic detection of a physical presence of a user of a data processing system, comprising:

means for selecting a proximity interval of time, said proximity interval of time being an amount of time for a user to leave the data processing system, and exit a selected area that is in proximity to the data processing system;

means for detecting at least two presence indicating events in the data processing system, wherein a presence indicating event is an input event which occurs in the data processing system and which indicates the physical presence of a user within a physical area that is in proximity to the data processing system;

means for evaluating the presence indicating events to determine the physical presence of a user by determining if the two presence indicating events occur within an interval of time that is less than or equal to the proximity interval of time and if so, then for providing an indication that a user is within the selected area, and if not, then for providing an indication that a user is not within the selected area.

7. The apparatus of claim 6, wherein at least one of the presence indicating events is a verified event, wherein a verified event is a presence indicating event which requires a user's presence and is verified by a user.

8. The apparatus of claim 7, wherein the means for evaluating the presence indicating event to determine the physical presence of a user, further comprises:

means for logging the presence indicating event in a database.

* * * * *